United States Patent
Beckmann et al.

(10) Patent No.: US 9,325,709 B2
(45) Date of Patent: Apr. 26, 2016

(54) SYSTEM AND METHOD FOR IMPORTING AND MERGING CONTENT ITEMS FROM DIFFERENT SOURCES

(71) Applicant: Dropbox, Inc., San Francisco, CA (US)

(72) Inventors: Chris Beckmann, San Francisco, CA (US); Ramesh Balakrishnan, San Francisco, CA (US); Rajeev Nayak, San Francisco, CA (US); Yi Wei, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 160 days.

(21) Appl. No.: 13/725,625

(22) Filed: Dec. 21, 2012

(65) Prior Publication Data
US 2014/0181935 A1   Jun. 26, 2014

(51) Int. Cl.
*G06F 21/10* (2013.01)
*G06F 17/30* (2006.01)
*H04L 29/06* (2006.01)
*H04L 29/08* (2006.01)

(52) U.S. Cl.
CPC .......... *H04L 63/10* (2013.01); *G06F 17/30011* (2013.01); *G06F 17/30079* (2013.01); *G06F 21/10* (2013.01); *H04L 67/1095* (2013.01)

(58) Field of Classification Search
CPC .............................. G06F 21/10; G06F 17/30011
USPC ................................................................ 726/7
See application file for complete search history.

(56) References Cited

U.S. PATENT DOCUMENTS

| | | | |
|---|---|---|---|
| 2004/0168184 A1* | 8/2004 | Steenkamp et al. | 725/31 |
| 2004/0240670 A1* | 12/2004 | Man et al. | 380/277 |
| 2006/0059168 A1* | 3/2006 | Hamada et al. | 707/100 |
| 2006/0195422 A1* | 8/2006 | Cadiz et al. | 707/3 |
| 2007/0192797 A1* | 8/2007 | Kang et al. | 725/46 |
| 2007/0250920 A1* | 10/2007 | Lindsay | 726/7 |
| 2008/0275893 A1* | 11/2008 | Bodin et al. | 707/100 |
| 2009/0024671 A1* | 1/2009 | Johnson et al. | 707/201 |
| 2009/0327358 A1* | 12/2009 | Lukiyanov et al. | 707/203 |
| 2010/0064007 A1* | 3/2010 | Randall | 709/204 |
| 2011/0179049 A1* | 7/2011 | Caldwell et al. | 707/755 |
| 2011/0191446 A1* | 8/2011 | Dazzi et al. | 709/219 |
| 2011/0289184 A1* | 11/2011 | Wolinsky et al. | 709/217 |
| 2012/0131683 A1* | 5/2012 | Nassar et al. | 726/28 |
| 2012/0150919 A1* | 6/2012 | Brown et al. | 707/804 |
| 2013/0041828 A1* | 2/2013 | Gonzalez et al. | 705/51 |
| 2013/0262559 A1* | 10/2013 | Neerings et al. | 709/203 |
| 2013/0339314 A1* | 12/2013 | Carpentier et al. | 707/692 |

* cited by examiner

*Primary Examiner* — Dede Zecher
*Assistant Examiner* — Jason C Chiang
(74) *Attorney, Agent, or Firm* — Polsinelli PC

(57) ABSTRACT

Systems, methods, and computer-readable storage media for importing and merging photos from different sources are disclosed. The system receives credentials from a user, who has an account with a content management system. The credentials are associated with content item storage entities such as photo repositories. The system accesses the photo repositories, using the plurality of credentials if authorization is required for data access. The system identifies source photo data in each of the photo repositories, and duplicates the source photo data in the content management system account to create consolidated photo data.

22 Claims, 8 Drawing Sheets

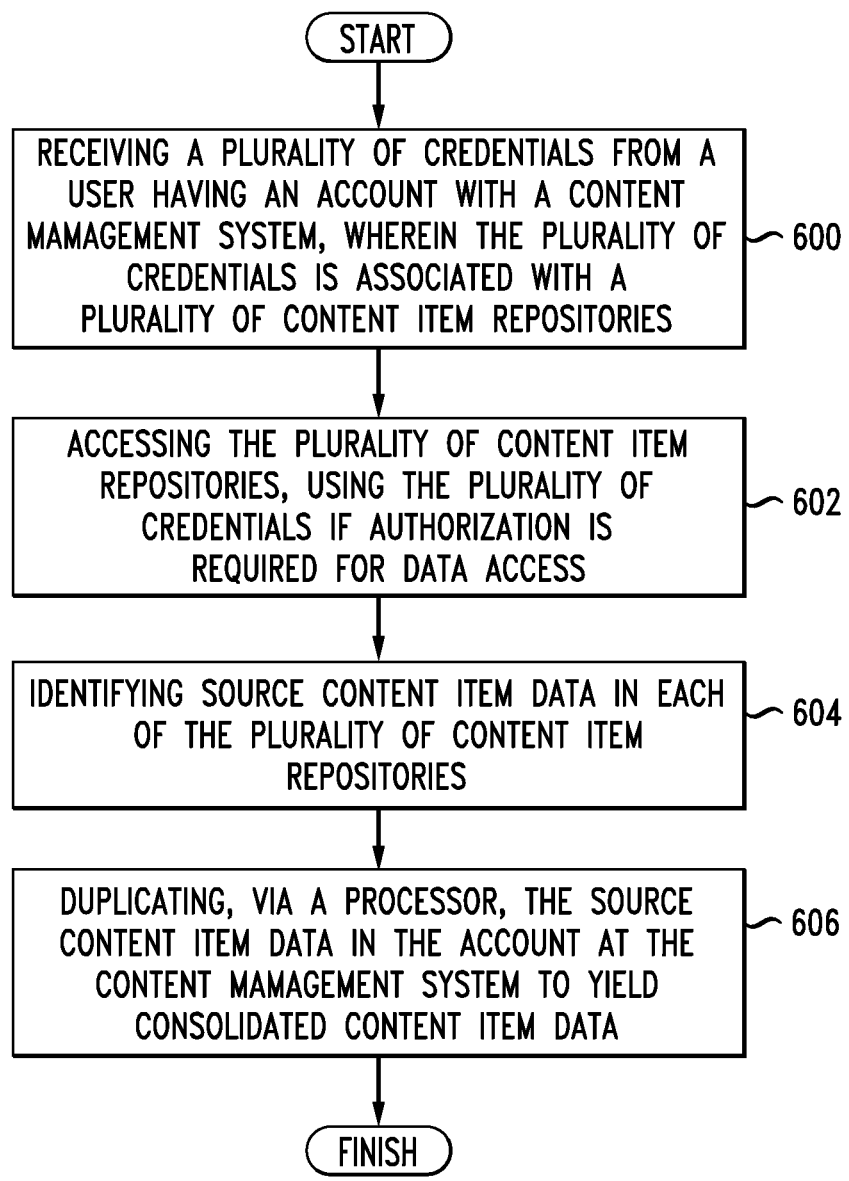

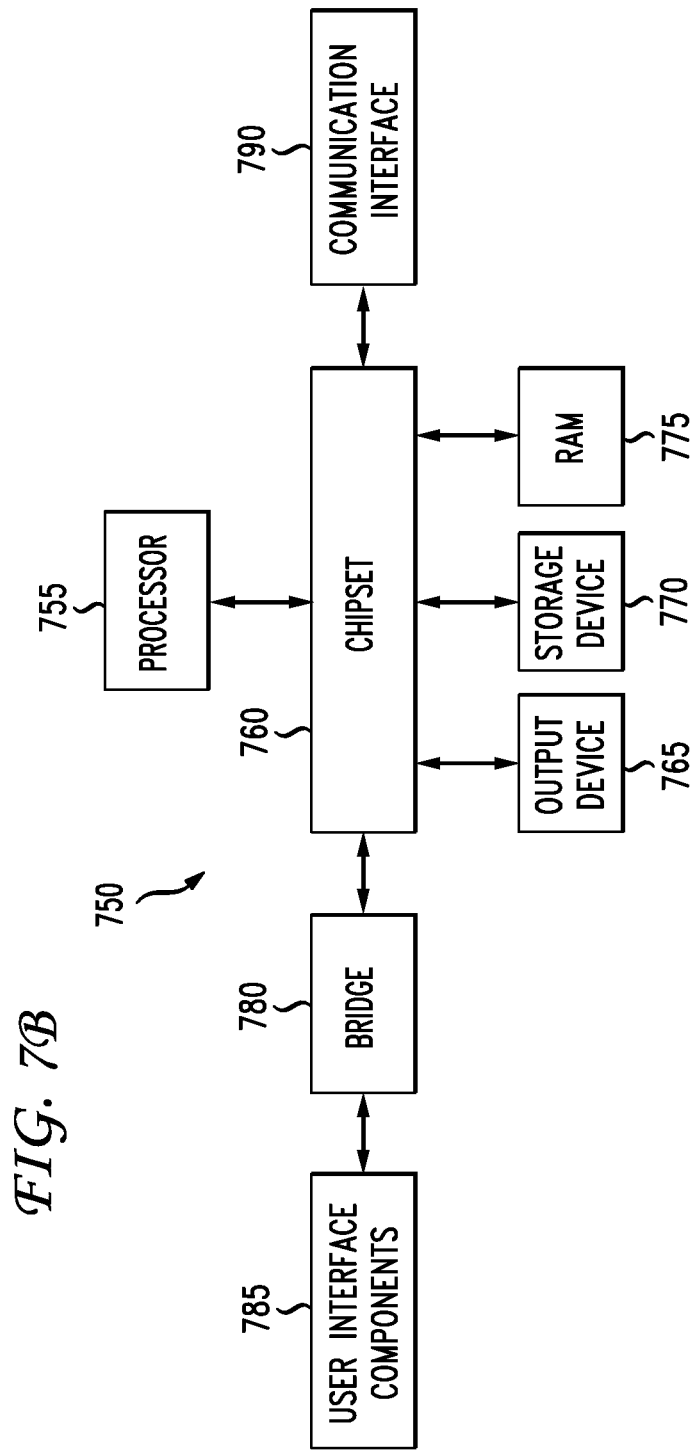

SYSTEM AND METHOD FOR IMPORTING AND MERGING CONTENT ITEMS FROM DIFFERENT SOURCES

TECHNICAL FIELD

The present technology pertains to content management systems and more specifically pertains to importing content items such as photos to a content management system from various sources.

BACKGROUND

Online storage providers allow users to store vast amounts of personal data in the "cloud," or network computing resources available through the Internet, and access and share such data through a web browser, a desktop interface, or a mobile application. The growing popularity of such services has enabled users to store, update and backup data from remote locations using diverse processing devices, with ease and efficiency.

Despite the promise of cloud computing to offer one central location to store and access all of one's data, multiple cloud service providers, in reality, have provided different and potentially incompatible storage locations where duplicate and often inconsistent copies of data may exist at any given time. For instance, a user may place her wedding photos simultaneously on an online photo-sharing website, a social media network, a flash memory device on her mobile phone, and a personal blog. Over time, however, the identical data stored at these multiple storage locations may become out of sync as the user adds, deletes, or modifies one or more photos at some but not all of the locations. As users can upload from multiple devices to multiple services, the information may be spread out over a multitude of storage devices, services, and locations. This makes it difficult for one to maintain consistent up-to-date identical copies of the data. The value of an online storage medium or an off-site backup location will dramatically decrease if the integrity and reliability of the stored data may be called into question at any time because one cannot ascertain whether a given copy of data is most current and up-to-date.

The problem is further exacerbated when it is difficult or impractical to collect and merge all the data that is already scattered throughout multiple Internet-based storage services. Migrating data from one such service to another can be a daunting task, as the process often requires manual user input by the user. Even if successfully migrated, the data needs to be constantly monitored to maintain its consistency between the two data sources. The complexity of these tasks only heightens as the number of data resources increases.

SUMMARY

Features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out hereinafter. These and other features of the disclosure will become more fully apparent from the following description and accompanying drawings, or can be learned by the practice of the principles set forth herein.

The approaches set forth herein can be used to import into a central management system content, such as photo data, that are distributed over multiple data repositories, organize the data, and merge them into consolidated content item data. In one aspect, an example system can receive from a user her usernames, passwords, and other credentials that may be needed to access data residing in other content item repositories. The content item repositories may be a local storage device, an online file storage system, a photo-sharing service, a social media network, an e-mail server, an RSS feed, or any other source of content item data. The data may have been uploaded by the user or anyone else. In one aspect, the credentials can be stored in the system for later use.

Using the credentials and other information that the user has provided, the system can access the multiple content item repositories and identify content item data to be imported. In one aspect, the user can manually designate which content items to import or which content items to exclude. The system can then import the identified content item data in the content item repositories by duplicating them in the system's data storage. In one aspect, any metadata associated with the content items can also be imported to supplement the imported content items. Once the duplicating process is complete, the original content item in the various content item repositories may be safely deleted, either by the system or by the user at a later time. By consolidating all the content item data that were previously stored over multiple data sources, the user can access and organize her information more efficiently.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 6 shows an example method embodiment.

FIG. 7B shows a computer system having a chipset architecture.

DETAILED DESCRIPTION

Various embodiments of the disclosure are discussed in detail below. While specific implementations are discussed, it should be understood that this is done for illustration purposes only. A person skilled in the art will recognize that other components and configurations may be used without departing from the spirit and scope of the disclosure.

The present disclosure addresses importing and merging content from different sources. In the following disclosure, photo content will be used to provide an illustrative example to facilitate an understanding of the novel principles. However it is noted that the principles of the present disclosure are not limited to photo content but may be equally applied to any content such as documents, video, audio, applications, metadata, etc. A system, method, and computer-readable media are disclosed which can receive login credentials from a user, use these credentials to gain access to one or more photo repositories, and duplicate photo data residing in these photo repositories in a consolidated photo repository.

Specifically, the system, method, and computer-readable media disclosed herein can be used to import into a central management system content item data that are distributed over multiple content item repositories and merge them into consolidated content item data. In one aspect, the example system can receive from a user her usernames, passwords, and other credentials that may be needed to access data residing in other content item repositories. Using the credentials that the user has provided, the system can access the multiple content item repositories and identify content item data to be imported. The system can then import the identified content item data in the content item repositories by duplicating them in the system's data storage. Any metadata associated with the content item can also be imported to supplement the imported content item.

Figure 1:
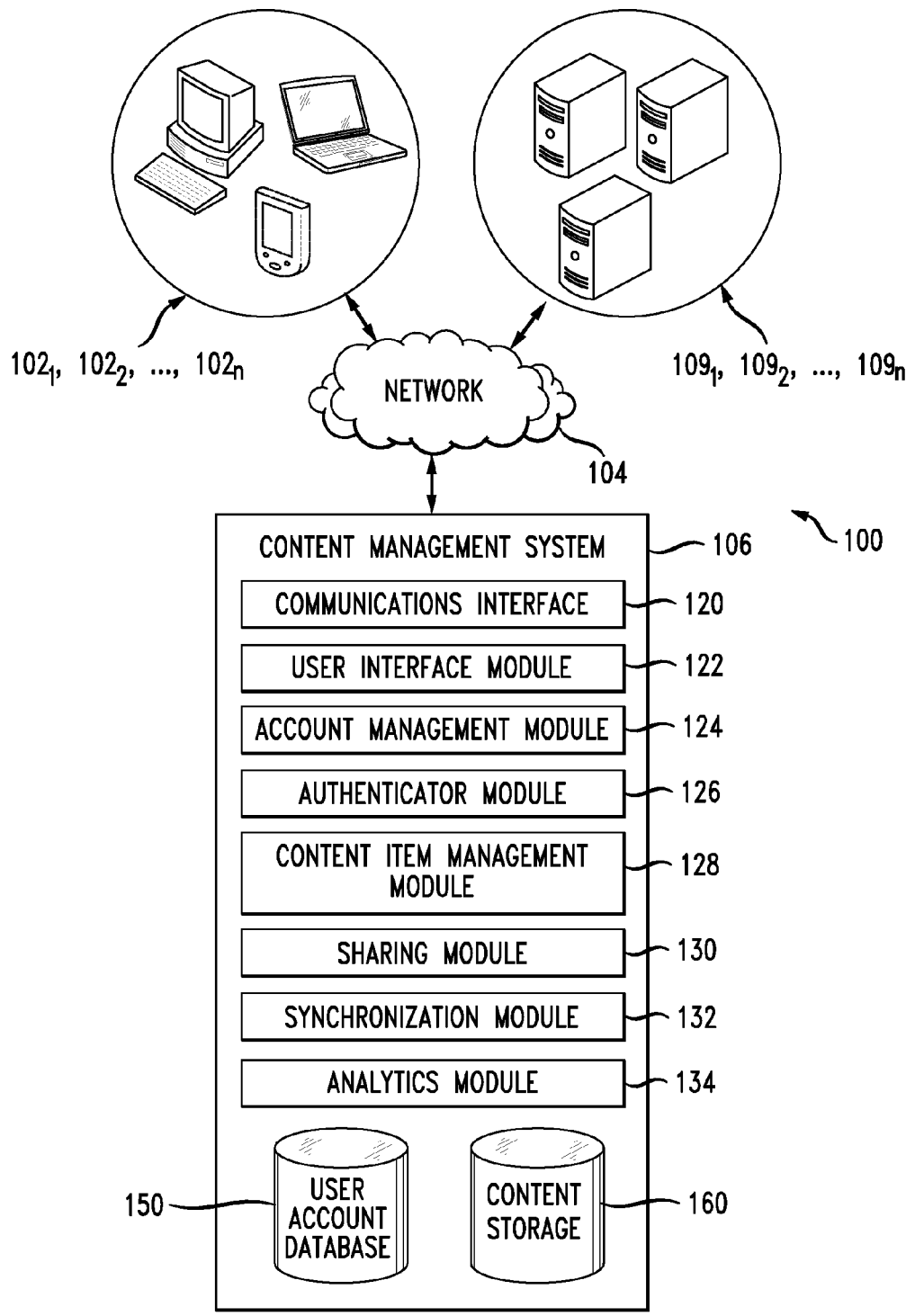
FIG. 1 shows an exemplary configuration of devices and a network in accordance with the invention.

Exemplary system configuration 100 is shown in FIG. 1, wherein electronic devices communicate via a network for purposes of exchanging content and other data. The system can be configured for use on a wide area network such as that shown in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, a user can interact with content management system 106 through client devices $102_1, 102_2, \ldots, 102_n$ (collectively "102") connected to network 104 by direct and/or indirect communication. Content management system 106 can support connections from a variety of different client devices, such as desktop computers; mobile computers; mobile communications devices, e.g. mobile phones, smart phones, tablets; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with content management system 106 via a client-side application installed on client device $102_i$. In some embodiments, the client-side application can include a content management system specific component. For example, the component can be a stand-alone application, one or more application plug-ins, and/or a browser extension. However, the user can also interact with content management system 106 via a third-party application, such as a web browser, that resides on client device $102_i$ and is configured to communicate with content management system 106. In either case, the client-side application can present a user interface (UI) for the user to interact with content management system 106. For example, the user can interact with the content management system 106 via a client-side application integrated with the file system or via a webpage displayed using a web browser application.

Content management system 106 can make it possible for a user to store content, as well as perform a variety of content management tasks, such as retrieve, modify, browse, and/or share the content. Furthermore, content management system 106 can make it possible for a user to access the content from multiple client devices 102. For example, client device $102_i$ can upload content to content management system 106 via network 104. The content can later be retrieved from content management system 106 using the same client device $102_i$ or some other client device $102_j$.

To facilitate the various content management services, a user can create an account with content management system 106. The account information can be maintained in user account database 150. User account database 150 can store profile information for registered users. In some cases, the only personal information in the user profile can be a username and/or email address. However, content management system 106 can also be configured to accept additional user information.

User account database 150 can also include account management information, such as account type, e.g. free or paid; usage information, e.g. file edit history; maximum storage space authorized; storage space used; content storage locations; security settings; personal configuration settings; content sharing data; etc. Account management module 124 can be configured to update and/or obtain user account details in user account database 150. The account management module 124 can be configured to interact with any number of other modules in content management system 106.

An account can be used to store content, such as documents, text files, audio files, video files, etc., from one or more client devices 102 authorized on the account. The content can also include folders of various types with different behaviors, or other mechanisms of grouping content items together. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

The content can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where the content items are being stored by content management system 106. In one variation, content management system 106 can store the content items in the same folder hierarchy as they appear on client device $102_i$. However, content management system 106 can store the content items in its own order, arrangement, or hierarchy. Content management system 106 can store the content items in a network accessible storage (SAN) device, in a redundant array of inexpensive disks (RAID), etc. Content storage 160 can store content items using one or more partition types, such as FAT, FAT32, NTFS, EXT2, EXT3, EXT4, ReiserFS, BTRFS, and so forth.

Content storage 160 can also store metadata describing content items, content item types, and the relationship of content items to various accounts, folders, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate files or duplicate segments of files. Instead of storing multiple copies, content storage 160 can store a single copy and then use a pointer or other mechanism to link the duplicates to the single copy. Similarly, content storage 160 can store files more efficiently, as well as provide the ability to undo operations, by using a file version control that tracks changes to files, different versions of files (including diverging version trees), and a change history. The change history can include a set of changes that, when applied to the original file version, produce the changed file version.

Content management system 106 can be configured to support automatic synchronization of content from one or more client devices 102. The synchronization can be platform agnostic. That is, the content can be synchronized across multiple client devices 102 of varying type, capabilities, operating systems, etc. For example, client device $102_i$ can include client software, which synchronizes, via a synchronization module 132 at content management system 106, content in client device $102_i$'s file system with the content in an associated user account. In some cases, the client software can synchronize any changes to content in a designated folder and its sub-folders, such as new, deleted, modified, copied, or moved files or folders. The client software can be a separate software application, can integrate with an existing content management application in the operating system, or some combination thereof. In one example of client software that integrates with an existing content management application, a user can manipulate content directly in a local folder, while a background process monitors the local folder for changes and synchronizes those changes to content management system 106. Conversely, the background process can identify content that has been updated at content management system 106 and synchronize those changes to the local folder. The client software can provide notifications of synchronization operations, and can provide indications of content statuses directly within the content management application. Sometimes client device $102_i$ may not have a network connection available. In this scenario, the client software can monitor the linked folder for file changes and queue those changes for later synchronization to content management system 106 when a network connection is available. Similarly, a user can manually stop or pause synchronization with content management system 106.

A user can also view or manipulate content via a web interface generated and served by user interface module 122. For example, the user can navigate in a web browser to a web address provided by content management system 106. Changes or updates to content in the content storage 160 made through the web interface, such as uploading a new version of a file, can be propagated back to other client devices 102 associated with the user's account. For example, multiple client devices 102, each with their own client software, can be associated with a single account and files in the account can be synchronized between each of the multiple client devices 102.

Content management system 106 can include a communications interface 120 for interfacing with various client devices 102, and can interact with other content and/or service providers $109_1$, $109_2$, ..., $109_n$ (collectively "109") via an Application Programming Interface (API). Certain software applications can access content storage 160 via an API on behalf of a user. For example, a software package, such as an app on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access files. Further, content management system 106 can include analytics module 134 that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing sharing content publicly or privately. Sharing content publicly can include making the content item accessible from any computing device in network communication with content management system 106. Sharing content privately can include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

In some embodiments, content management system 106 can include a content item management module 128 for maintaining a content directory. The content directory can identify the location of each content item in content storage 160. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 106 can use the content path to present the content items in the appropriate folder hierarchy.

A content entry can also include a content pointer that identifies the location of the content item in content storage 160. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 130 can be configured to add a user account identifier to the content entry associated with the content item, thus granting the added user account access to the content item. Sharing module 130 can also be configured to remove user account identifiers from a content entry to restrict a user account's access to the content item.

To share content publicly, sharing module 130 can be configured to generate a custom network address, such as a uniform resource locator (URL), which allows any web browser to access the content in content management system 106 without any authentication. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, sharing module 130 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 130 can be configured to change the value of the flag to 1 or true after generating a URL to the content item.

In some embodiments, sharing module 130 can also be configured to deactivate a generated URL. For example, each content entry can also include a URL active flag indicating whether the content should be returned in response to a request from the generated URL. For example, sharing module 130 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 130 can reactivate the URL by again changing the value of the URL active flag to 1 or true. A user can thus easily restore access to the content item without the need to generate a new URL.

While content management system 106 is presented with specific components, it should be understood by one skilled in the art, that the architectural configuration of system 106 is simply one possible configuration and that other configurations with more or less components are also possible.

Figure 2:
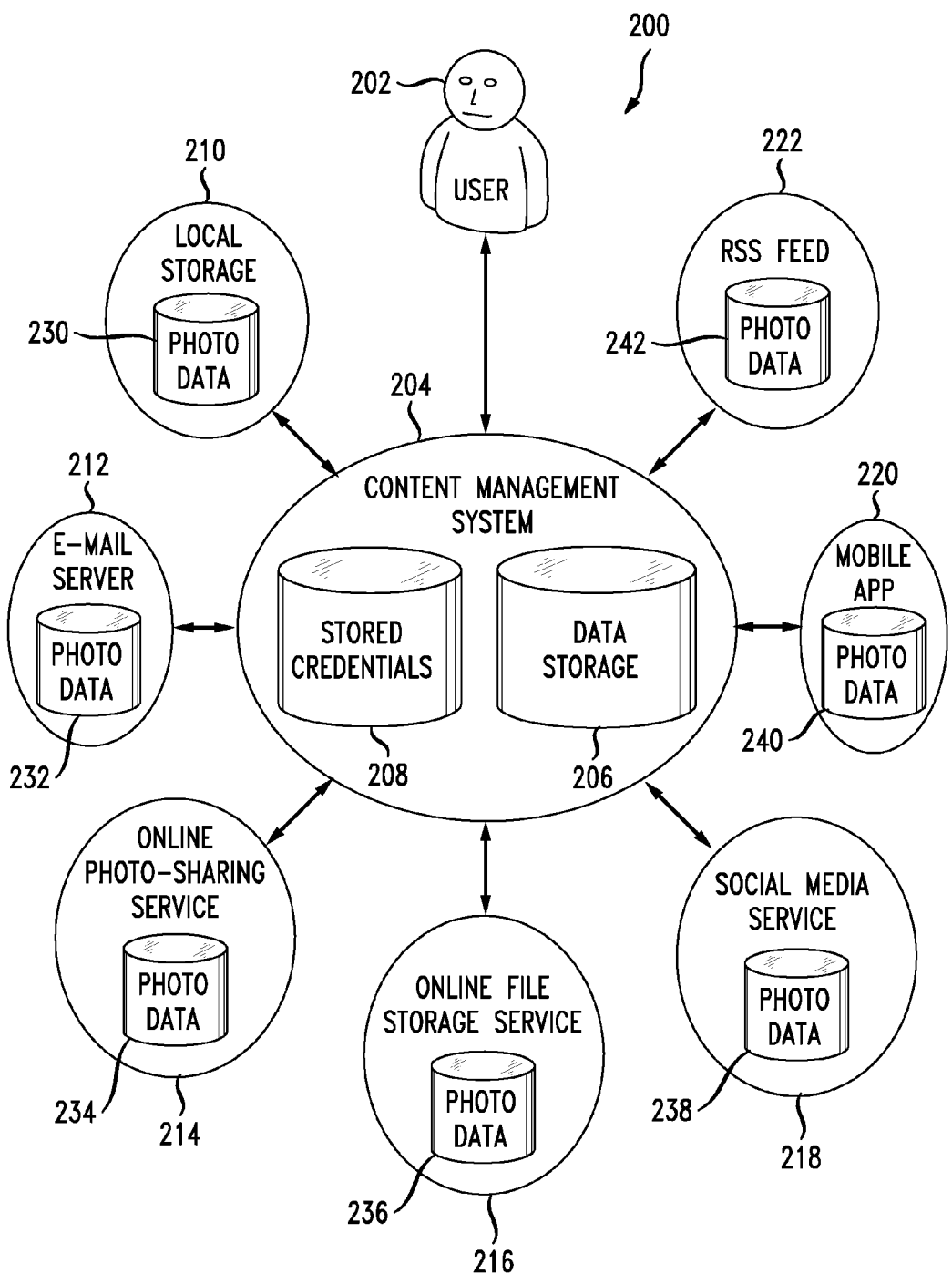
FIG. 2 shows an exemplary system embodiment for importing and merging content such as photo data from various sources.

FIG. 2 shows an exemplary system embodiment for importing and merging photo data from various sources. Content management system 106 can offer to its users an offsite storage space accessible through the Internet. User 202 can be a member of the content management system 106 and can have an account there. User 202 may have a free-of-charge account with content management system 106 or may have a paid membership. For example, a content management system may offer different price tiers that enable different functionality such as a basic membership that allows a one-time synchronization with one other service, a middle-tier membership that allows continuous synchronization with three other services, and a premium tier that allows continuous synchronization with unlimited number of services. The data in content management system 106 can be stored logically separated for each user so that one user may not view or access another user's data.

Photo repositories 210, 212, 214, 216, 218, 220, 222 (hereinafter, "photo repository 210-222" or "photo repositories 210-222") can be any online or offline location that stores photo data 230, 232, 234, 236, 238, 240, 242 (hereinafter, "photo data 230-242") that may be retrieved, with or without authentication. Although photo repositories 210-222 are categorized into several categories such as online photo-sharing services 214 and social media services 218, these labels are merely illustrative and there are no rigid rules of categorization. Moreover, the illustrative categories suggested here are not mutually exclusive and one photo repository may fall under more than one category listed in this disclosure. For example, an online blog that publishes text and accompanying photographs and offers an RSS feed can be categorized as an online file storage service, a social media service, and/or an RSS feed.

Photo data 230-242 can be any data, typically digital, that represents photographic images. Some examples include files with .BMP, .PNG, .GIF, .JPG, .TIFF, or .RAW file extensions in their associated file formats. Some of these files may be compressed and/or encoded to decrease their file sizes.

Photo data 230-242 may include metadata that contains extra information that describes each photographic image. While not specifically part of the data that represents an image, the metadata describes how the image was captured or other information associated with the image. This may include the time and place that the photograph was taken; what type of camera, lens, or other equipment was used to take the photograph; which camera settings were used such as aperture, shutter speed, exposure, ISO sensitivity, and white balance; the identities of the people or objects depicted in the photo; analysis data that was used to automatically detect the identities of the people or objects depicted in the photo; and any other information that a person might have attached to the photo data before or after taking the photograph such as comments, ratings, categories, and tags. The various photo repositories can further modify or add to the metadata as they receive and process the photos.

One example of a photo repository is local storage 210. Local storage 210 can include any storage medium such as a magnetic disk (e.g., hard disk drive), an optical disk (e.g., CD-ROM, DVD-ROM, Blu-Ray), random access memory, tape drives, and a semiconductor memory (e.g., flash memory, solid-state drive). Local storage 210 may be attached to a desktop computer, a laptop computer, a smartphone, a camera, or other devices capable of taking photographs or storing photo data. Accessing photo data 230 on a local storage device 210 typically does not require authentication but occasionally it may ask for an authorized user's credentials for access, as when the stored data is encrypted and/or password-protected.

Another example of a photo repository is e-mail server 212. E-mail server 212 may be private as with an enterprise e-mail server or a university e-mail server. Otherwise e-mail server 212 may be public as with commercial web e-mail services. The web-based e-mail services are typically open for the public to join and use and are available through a web interface as well as the Post Office Protocol, the Internet Message Access Protocol, and other methods of access. Photo data 232, which is stored in e-mail server 212, may be attachments to individual e-mail messages or links, embedded in e-mail messages, which point to image files. Photo data 232 may be stored in a photo gallery that has separate and independent storage space from the e-mail messages. E-mail server 212 typically requires user authentication to access the data therein.

Yet another example of a photo repository is online photo-sharing service 214, also known as an image hosting service. Some commercial online services, for instance, allow users to upload via the Internet their personal digital photos to the servers owned and operated by the services for permanent storage and/or for sharing them with other people on the Internet. They are similar to online file storage services, but are typically tailored specifically for uploading image files, sometimes offering additional image-specific features such as image editing, publishing, and printing. Online photo-sharing service 214 typically requires user authentication to access photo data 234.

Still another example of a photo repository is online file storage service 216. These online data providers allow their users to freely upload their personal data via the Internet. The users can later download the data at their convenience or share them with other people on the Internet. These data may include photo data 236. Content management system 106 can also be an online file storage service. In such a case, the two online file storage services may be two distinct services, such as when copying photo data from one service to another, or two distinct accounts within one identical service, such as when copying photo data from one user account to another user account. Online file storage service 216 typically requires user authentication to access photo data 236 stored therein.

A still further example of a photo repository is social media service 218. Social media service 218 allows its members or visitors to interact with each other, and facilitates the creation of social networks. A website or a blog can be a social media service. A social network allows a like-minded or otherwise related group of people to meaningfully associate with other and interact by sharing information and data. For instance, a member of social media service 218 can upload his family photos to the service and make them available to his associates in the social network. The photos, in this case, become part of the network and other people in the network can access those photos. Photo data 238 in social media service 218 may have been uploaded by user 202, an associate within the user's social network, a person of interest, or a stranger. With proper permission and/or authentication user 202 may access and retrieve photo data 238 that belongs to her associates within her social network but that is accessible to user 202.

Besides the metadata that is directly embedded in the image files themselves, social media service 218 may store other metadata that is associated with the images that are hosted by the service. These extraneous metadata can be generated by the actions of the individuals within the social network and may include comments, ratings (e.g., star ratings, "Like" statuses), descriptions, captions, alternative text, URL links, upload dates, view counts, download counts, popularity, identity tags, facial recognition analysis data, geo-location data, categories, and hashtags. Social media service 218 typically requires user authentication to access photo data 238.

Yet another example of a photo repository is mobile app 220. Mobile app 220, which runs on a mobile device such as a smartphone or a tablet device, can allow user 202 to upload image files stored on the mobile device or new photographs taken with the mobile device. Once uploaded, photo data 240 can reside in a server that is associated with mobile app 220. Alternatively, mobile app 220 may allow user 202 to take photos with the mobile device, but then leave photo data 240 on the mobile device without uploading the images to a server. Mobile app 220 may or may not require user authentication to access photo data 240 in its server.

Still yet another example of a photo repository can be Rich Site Summary (RSS) feed 222, also known as the Really Simple Syndication feed. RSS feed 222 can allow any device or software to access data that tends to be frequently published or updated on the Internet. These data may include photo data 242. Although stand-alone RSS feeds do exist, RSS feed 222 is often offered as an optional or supplementary method of accessing data as part of a larger scheme such as online photo-sharing service 214, online file storage service 216, or social media service 238. RSS feed 222 typically does not require authentication, but some feeds may be protected with passwords.

User 202, who has an account with content management system 106, may also have accounts with one or more of photo repositories 210-222. User 202 also may have stored photo data 230-242 that are scattered throughout one or more of photo repositories 210-222. User 202 can provide the information to content management system 106 regarding which photo repositories photo data 230-242 are located. User 202 may also provide to the content management system 106 other information necessary to access and retrieve photo data 230-242. This information may include credentials, such as usernames and passwords, for those photo repositories that require them in order to access data. The credentials may be stored in the user's account at content management system 106. Stored credentials 208 can be used later to import photo data 230-242 from photo repositories 210-222 without the need to ask user 202 again for the credentials.

Alternatively, instead of storing the credentials at content management system 106, user 202 may, through an individual photo repository such as a social media service, grant content management system 106 authorization to access data in that photo repository. As an illustration, a content management system user may wish to import into her file storage system account all of the photos that she has uploaded to a social media service. One way of accomplishing this task is for content management system 106 to request permission from the social media service to access the user's social media data. The social media service, in turn, asks the user whether the user does in fact intend to grant access to content management system 106. The user provides her credentials to the social media service for authentication, but not necessarily to content management system 106, and then consents to granting permission to content management system 106. The social media service remembers this decision and allows content management system 106 to access the user's data on the social media service until the user revokes this authorization.

Once content management system 106 receives all the necessary information, including any credentials, security tokens, and authorizations, content management system 106 can identify the photo data 230-242 in photo repositories 210-222 that is to be duplicated in content management system 106. This may be done automatically by content management system 106 or it may be facilitated by any input or feedback from user 202. For instance, content management system 106 can look through all of the user's data on an online file storage service, and only download what appear to be image files, or user 202 may direct content management system 106 to import from an online photo-sharing service, only those photos that were uploaded in the last twelve months. In another example, user 202 can direct content management system 106 to only import images of a specific file type such as .PNG or photos taken by a particular type of camera.

After all the photo data to be migrated is identified, the data can be duplicated to content management system 106 to form data storage 206. Once duplicated, original photo data 230-242 may be deleted, if content management system 106 has proper security permission to do so, based on a decision of user 202 or a previously set option. For example, after content management system 106 imports all the photo data from a local hard disk drive, content management system 106 may ask user 202, via a prompt, whether user 202 would like to delete the copied files from the local hard disk drive. If user 202 chooses to remove the data, content management system 106 will delete the data. Alternatively, content management system 106 can offer a user setting, which user 202 can set in advance to have content management system 106 always delete originals when it imports photo data. Removing the original files can be beneficial as it not only frees up extra space at the data source, but also decrease the risk of creating inconsistent duplicate data. When duplicating identified photo data 230-242, all or part of the data may be duplicated. The image files may be manipulated depending on a user setting. For instance, user 202 may direct content management system 106 to shrink down all the photo images that it imports from the various photo data sources to resolutions of no larger than 800×600, for example. In another example, user 202 may choose to manipulate some of the image files being imported by applying an image filter. Among the data that are being imported from the various photo repositories to data storage 206 may be the metadata that can contain further information about the imported image files. These metadata then may be associated with the data storage 206.

When collecting image files from multiple sources it is possible to end up with multiple copies of the same image files in data storage 206. For instance, if user 202 had previously uploaded an image file named "MyPhoto.jpg" to online photo-sharing service 214, online file storage service 216, and social media service 218, and subsequently content management system 106 imports the same image from all three sources, there would exist three identical copies of "MyPhoto.jpg" in data storage 206, possibly saved under different file names. In one embodiment, content management system 106 may identify and remove all but one copy for each set of duplicates. Such identification may be done automatically through artificial intelligence and/or manually through user input.

In another embodiment, content management system 106 can offer user 202 the option of "normalizing" all the imported photos in data storage 206 in one batch operation. Such normalization may entail making the image files more uniform in terms of size, dimension, orientation, brightness, hue, compression rate, or file format. For example, a user may direct content management system 106 to keep all of her files under 800 KB, rotate every photo in the portrait mode to the landscape mode, and convert every image file to the JPG file format.

In one embodiment, the duplication of photo data 230-242 may occur one time only or user 202 may choose to set up a regular schedule at content management system 106 to periodically identify and retrieve the newest copies of the image files from the various photo repositories 210-222. This way, data storage 206 will be always be kept up to date and synchronized with source photo data 230-242. For example, content management system 106 may access the photo repositories 230-242 at a regular interval, such as every twelve hours, and duplicate any image files. In another embodiment, content management system 106 may set up "push" notifications with various photo repositories 210-222, so that content management system 106 is notified of changes in any of photo repositories 210-222. Optionally, content management system 106 may also delete any duplicate copies of data in data storage 206 whenever their counterparts in source photo data 230-242 are found to have been deleted, in order to maintain the photo data in data storage 206 synchronized with source photo data 230-242. When accessing photo repositories 210-222, content management system 106 would use the stored credentials 208 if authentication were necessary.

In some embodiments, each of the multiple sources 210-222 of photo data can be ranked according to the quality of the data from the source. For example, in the case of photo data, the sources can be ranked by the quality of photos from each source. The quality may be based on resolution, color rendition, image size, as well as other parameters. The sources may be ranked in a number of different ways. Each of the sources 210-222 may be ranked by the user 202. Alternatively, the sources 210-222 may be ranked by the content management system, such as by obtaining quality information from third party entities, such as rating services, blogs, message boards, etc. The content management system also may rank the sources 210-222 according to a default ranking procedure, and then allow the user to modify the default rankings.

The source rankings then may be used by the system to choose the highest ranked copy of an image file to retain in the case that multiple copies of the same image are retrieved from multiple content item sources. Additionally, the system may use the rankings to choose a photo image from the highest ranked source to use as a thumbnail cover image for an event folder of photos from a specific event.

Figure 3:
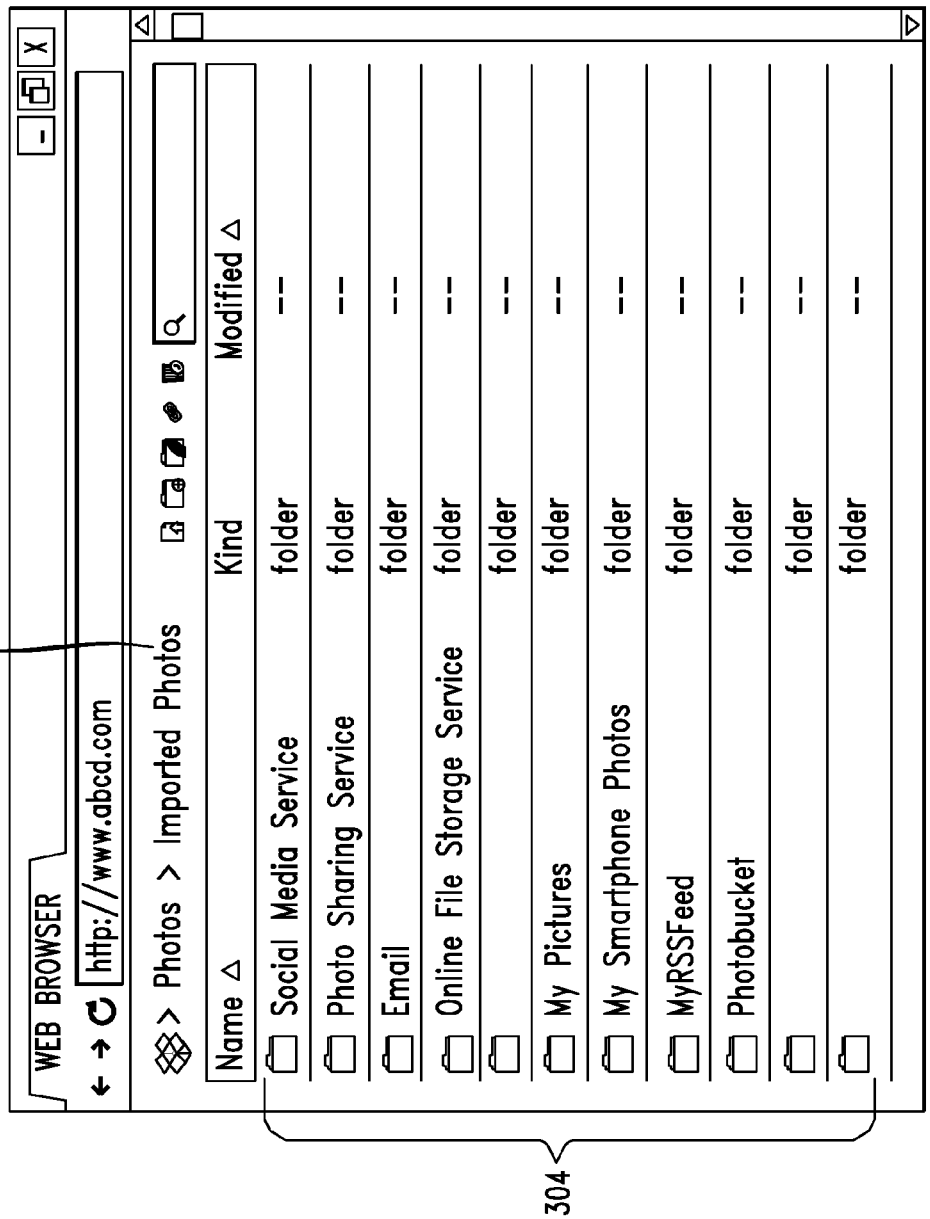
FIG. 3 shows an example of consolidated photo data presented via a web interface.

FIG. 3 shows an example of the photo data in data storage 206 presented via a web interface. Photo data can be organized in a number of ways. In one embodiment, the photo images may all be put in one folder or directory. In another embodiment, the photo images may be stored in a hierarchical file structure with multiple folders and subfolders. In yet another embodiment, the photo images may be stored either in one folder or multiple folders, but presented to user 202 as belonging to one or more logical photo albums. In FIG. 3, the photo data in data storage 206 is organized into an exemplary hierarchical folder structure 302, 304. In this particular example, the folders are labeled and organized according to the original locations of the aggregated photos, such as social media service, online photo-sharing service, email, and so forth. In one embodiment, this file structure is purely logical. Individual image files can reside within each of folders 304, and user 202 can access the individual image files by accessing one of folders 304. The file structure can be automatically created by content management system 106 or user 202 can create it manually. Once collected, the photo data in data storage 206 may be accessed by user 202 via web interface 300. Data storage 206 also can be accessed via other methods including a mobile app, a desktop application, a file system extension, a file transfer protocol, and a command line interface.

Figure 4:
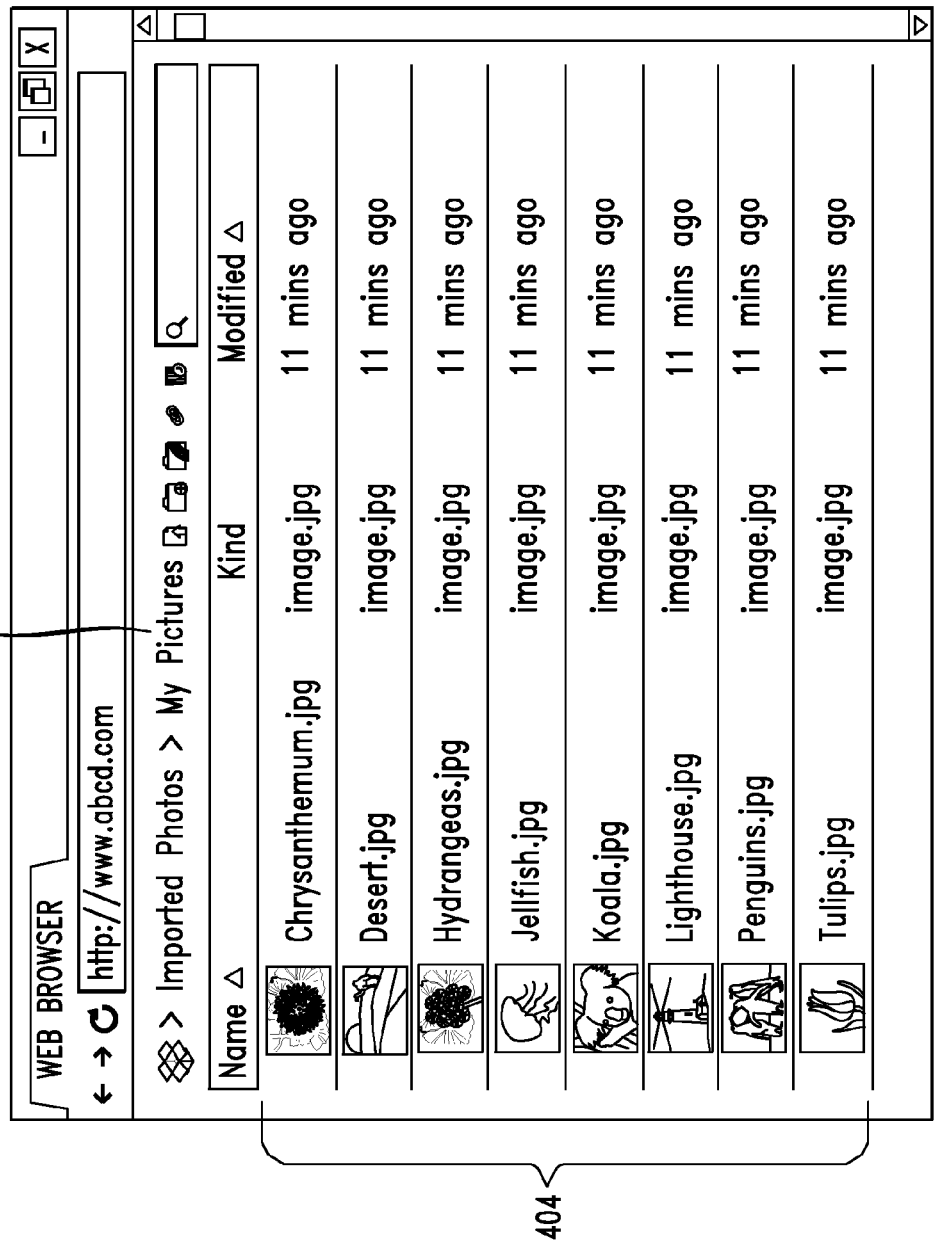
FIG. 4 shows another example of consolidated photo data presented via a web interface.

FIG. 4 shows another example of the photo data in data storage 206 presented via a web interface. In this example, folder structure 402 indicates that user 202 is currently accessing some of photo data 230 collected from the user's own local storage 210. The "My Pictures" subfolder containing photo data 230 collected from local storage 210 is nested inside a parent folder named "Imported Photos" 302, which may contain other subfolders corresponding to different photo repositories 212, 214, 216, 218, 220, 222. Inside "My Pictures" subfolder 402, individual image files copied from photo data 230 belonging to local storage 210 can be found. User 202 can edit, copy, move, delete, download, or share files 404. Since image files 404 are duplicate copies of original photo data 230, manipulating image files 404 residing in data storage 206 does not have an impact on the original photo data 230. However, user 202 may opt to have these manipulations reflected on the original copies as well, thereby achieving two-way data synchronization.

Figure 5:
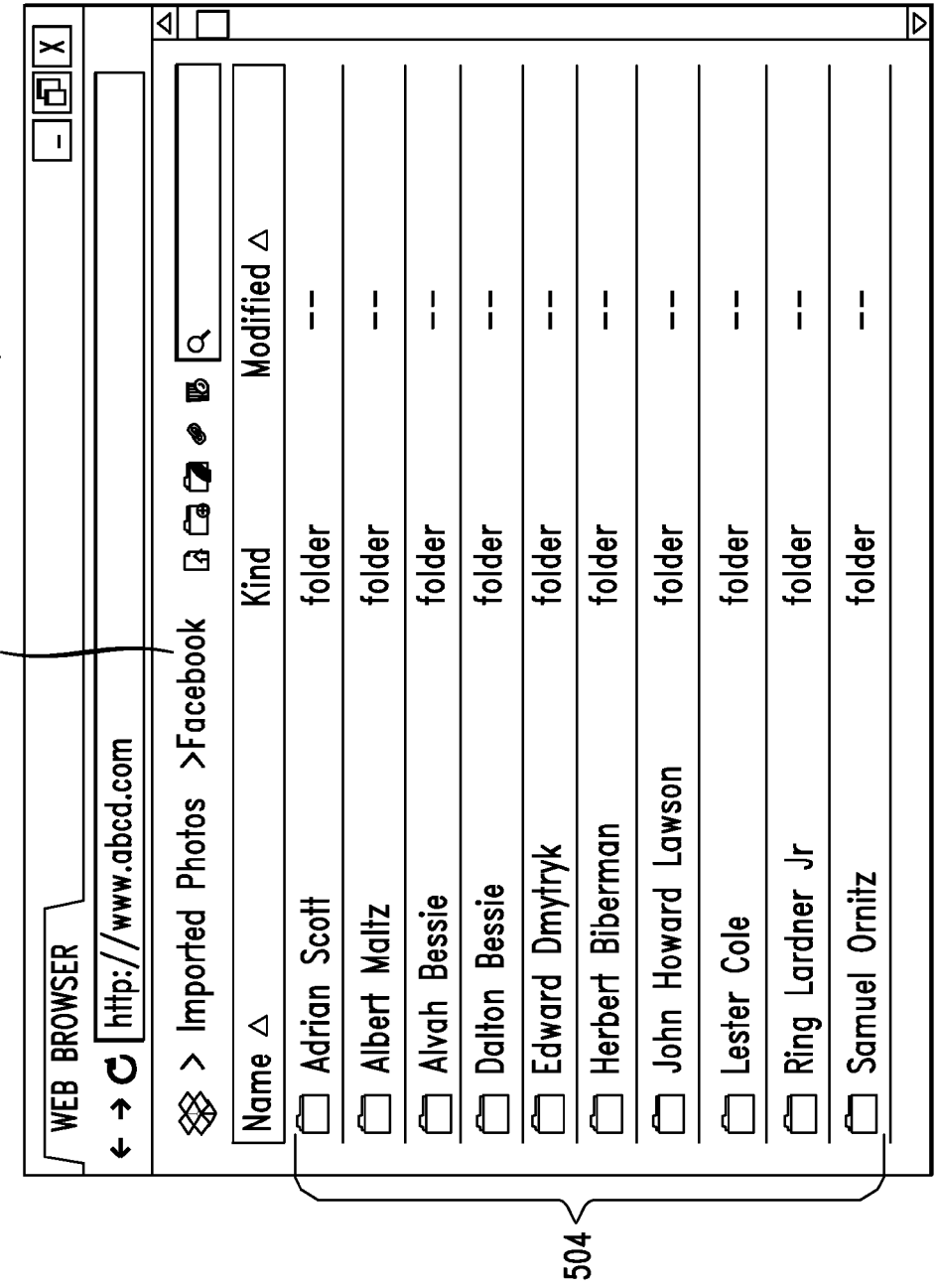
FIG. 5 shows yet another example of consolidated photo data presented via a web interface.

FIG. 5 shows yet another example of the photo data in data storage 206 presented via a web interface. In this particular example, folder structure 502 indicates that user 202 is accessing some of the data that had previously been copied from a social media service. Exemplary subfolder structure 504 indicates how photo data 238 imported from a social media service may be organized based on the social network of which user 202 is a part. Many photo repositories, and social media services in particular, allow a user to access not only the data that belongs to the user (i.e., the data that the user has uploaded) but also some data that was uploaded by other users, such as "friends" of the user. In addition, some photos that are designated "public" may be viewed by virtually anyone that has access to the Internet. In such cases, user 202 may also choose to aggregate the photo data that belongs to her associates in her social network into data storage 206. In one embodiment, the photo data in data storage 206 may be organized according to the names of the friends in the social network, to whom the photos originally belonged. When user 202 accesses these individual folders she will be able to view and download the portions of data storage 206 that belonged to each of the associates. In another embodiment, the photo data that was imported from a social media service may all be placed in one folder instead.

Having disclosed some system components and concepts, the disclosure now turns to an exemplary method embodiment shown in FIG. 6. For the sake of clarity, the method is described in terms of an exemplary system 106, as shown in FIG. 1, configured to practice the method. The steps outlined herein are exemplary and can be implemented in any combination thereof, including combinations that exclude, add, or modify certain steps.

Content management system 106 can receive a plurality of credentials from a user having an account with content management system 106, wherein the plurality of credentials is associated with a plurality of content item repositories (600). Content management system 106 can store the plurality of credentials that it received from the user at content management system 106 or at a separate storage so that the information can be used later. The content item repositories can be a local storage, an e-mail server, an online photo-sharing service, an online file storage service, a social media service, an RSS feed, a mobile app, or any other physical or logical place where digital content items may be stored. Content management system 106 can then accesses the plurality of content item repositories, using the plurality of credentials if authorization is required for data access (602). If no authorization is required for any of the plurality of content item repositories, the credentials do not need to be used to access those content item repositories. For example, if no authorization is necessary to access local storage, then the local storage may be accessed without the need for credentials.

Next, content management system 106 can identify source content item data in each of the plurality of content item repositories (604). For example, content management system 106 may identify the 56 photos that the user has uploaded to a social media service, 388 photos that the user has uploaded to an online photo-sharing service, 31 photos that have been attached to the messages on the user's e-mail account, and 100 photos in the RSS feed that the user has subscribed to. Again, it may be necessary to use the plurality of credentials to access these data. Then, content management system 106 can copy the source content item data in the account to content management system 106 to yield consolidated content item data (606). The duplication can be done through application programming interface commands that the content item repositories may provide. The duplication can also be done through one or more of a number of mechanisms known to those of skill in the art. For instance, in another embodiment, the duplication may be done through a series of HTML requests, the same way a human user would download photos through a web browser. The process of duplicating or migrating the source content item data into the consolidated content item data may be done automatically or semi-automatically with the help of the user. For example, the user may dictate to content management system 106 which content item repositories to pull the content item data from, which content item files to copy, what date range should be used to filter the content item data, which types of metadata should be imported along with the content item data, etc.

The following non-limiting example shows some of the principles set forth above. Ursula, a professional photographer, is a user of a content management system. She stores many of the digital photographs that she has created over the course of her professional career in the internal hard disk drive inside her laptop computer and five of her external hard disk drives. Some other photos are stored inside the flash memory device of her smartphone. Many of these photos are backed up in her account at the online storage provider as duplicate copies but some copies of the photos only exist at the online storage provider as she has since deleted the originals from her internal hard disk drive, the external hard disk drives, or her smartphone. Although the internal hard disk drive is not encrypted, all of her external drives are encrypted and password-protected. The content management system app installed on her smartphone asks for the user's permission to access the local data stored inside the phone's memory before installation.

In addition to using the content management system, Ursula is also a registered user of an online photo-sharing service, an online file storage service, a social media service, and a photo-sharing mobile app. All of these services employ one or more of the various methods of user authentication including usernames, passwords, one-time passwords, biometric authentication, third-party authentication, CAPTCHAs, image-based mutual authentication keys, and secret question/answer combos. Many of her digital photographs are stored in these repositories, either as originals or duplicate copies.

Ursula also has an account with a private e-mail server, which is shared by the colleagues at her photo studio. Over the past few years, she has exchanged a number of image files with her colleagues, editors, and clients via e-mail attachments and many of these image files still reside in the e-mail server as attachments. The data stored in the e-mail server is encrypted and password-protected.

In addition, Ursula operates a personal blog dedicated to the subject of photography. She routinely posts articles along with her latest works in photography. These contents, including the text and the photos, are available to the public via an RSS feed, which is updated the same time that she updates her blog. The RSS feed can be password-protected, but Ursula chose not to do so to make it more widely available to the public.

With each passing day, Ursula finds it more difficult to manage the growing body of her work that is scattered throughout the various disks, memories, and servers both local and remote. Moreover, the problem intensifies every time she manipulates an existing image file to create an edited copy or a derivative work based on the existing file, because doing so makes it extremely difficult to discern which of the multiple copies, often residing in different places, is the original, which is the latest or preferred copy, etc. She feels the need to consolidate all of her digital photographs into one location so that it would be easier to manage the entire body of her work in one location under one unified user interface. She decides that she wants all her photo data to be collected in to her account at the content management system.

She logs into her content management system account and follows its instructions to identify the photo-related services that she currently uses and provides all the necessary information including the usernames, passwords, and other credentials to authorize the content management system to access her photo data stored inside other services. The content management system encrypts and stores all the information in its server in a secure manner.

For some services such as a social network, she signs in directly with the service in order to authorize the service to grant access to the content management system. For example, Ursula can use the social media service's third-party log-in feature to give the content management system permission to access her social network data.

Once the content management system acquires all the necessary information from Ursula, it can start gathering data from the various photo repositories. There are several ways that the content management system may accomplish this task, including using Application Programming Interfaces (APIs) and following various data transfer protocols such as Hypertext Transfer Protocol, Internet Message Access Protocol, File Transfer Protocol, Post Office Protocol, etc. The content management system downloads all the image files that Ursula has designated from the various photo data sources and creates copies of the image files to Ursula's account or photo repository at the content management system. While doing so, Ursula chooses to delete some of the image files in their original locations but keep some of the originals.

The metadata that was associated with the various digital photo images is also copied over to the consolidated photo repository at the content management system and now is associated with the duplicate images in Ursula's account. Ursula decides to keep most of the metadata but chooses not to copy the "date taken" information from her studio e-mail server because she knows that data is unreliable.

With some of the photo repositories such as those residing in a social network, the content management system gives Ursula the option to import some of her friends' photos in addition to her own. Ursula decides to import some pictures uploaded by a few of her friends and colleagues by selecting their names or indicating a type of contact relationship for which photos should be downloaded. With regards to Ursula's e-mail server, the content management system may ask her whether to download only those image files that she has sent out or also download the image files that others have sent her and from which senders.

After the photos have been collected from the different sources, the content management system intelligently identifies identical or nearly identical photos among all the photo data that it has gathered from the numerous photo data sources and presents the list of duplicate photos to Ursula. Ursula goes through the list of duplicate copies on her web browser and checks off the ones that she would like to have removed. She further examines the entire list of imported photos to identify manually some of the photos that she does not want in her new photo collection. She finalizes her actions and the online storage provider finishes the import process.

Once all the source photo data is migrated into Ursula's account at the content management system, Ursula can view, access, and manipulate the duplicated photo data at her leisure without the need to access the individual photo repositories. She can also set up her account at the content management system so that the content management system periodically retrieves photo data from the photo repositories, using her saved login credentials. In this way, the content management system keeps her account up to date.

Figure 7A:
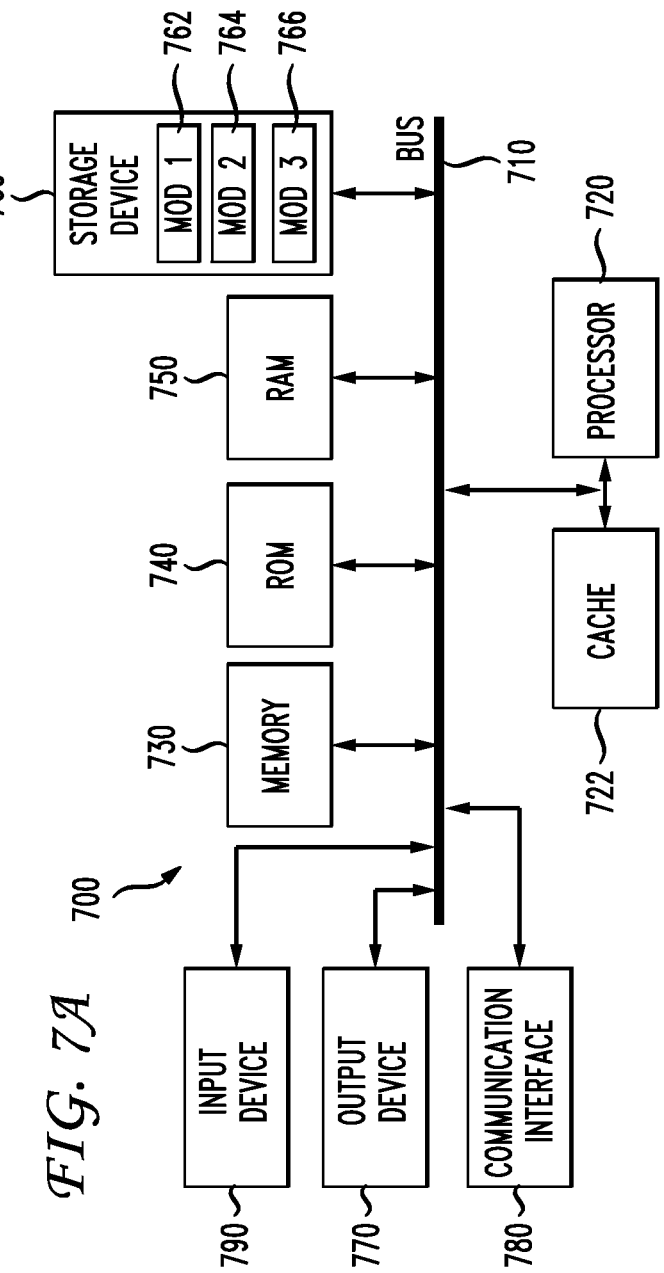
FIG. 7A shows a conventional system bus computing system architecture.

FIG. 7A, and FIG. 7B show exemplary possible system embodiments. The more appropriate embodiment will be apparent to those of ordinary skill in the art when practicing the present technology. Persons of ordinary skill in the art will also readily appreciate that other system embodiments are possible.

FIG. 7A shows a conventional system bus computing system architecture 700 wherein the components of the system are in electrical communication with each other using a bus 705. Exemplary system 700 includes a processing unit (CPU or processor) 710 and a system bus 705 that couples various system components including the system memory 715, such as read only memory (ROM) 720 and random access memory (RAM) 725, to the processor 710. The system 700 can include a cache of high-speed memory connected directly with, in close proximity to, or integrated as part of the processor 710. The system 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other system memory 715 may be available for use as well. The memory 715 can include multiple different types of memory with different performance characteristics. The processor 710 can include any general purpose processor and a hardware module or software module, such as module 1 732, module 2 734, and module 3 736 stored in storage device 730, configured to control the processor 710 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

To enable user interaction with the computing device 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing device 700. The communications interface 740 can generally govern and manage the user input and system output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof.

The storage device 730 can include software modules 732, 734, 736 for controlling the processor 710. Other hardware or software modules are contemplated. The storage device 730 can be connected to the system bus 705. In one aspect, a hardware module that performs a particular function can include the software component stored in a computer-readable medium in connection with the necessary hardware components, such as the processor 710, bus 705, display 735, and so forth, to carry out the function.

FIG. 7B shows a computer system 750 having a chipset architecture that can be used in executing the described method and generating and displaying a graphical user interface (GUI). Computer system 750 is an example of computer hardware, software, and firmware that can be used to implement the disclosed technology. System 750 can include a processor 755, representative of any number of physically and/or logically distinct resources capable of executing software, firmware, and hardware configured to perform identified computations. Processor 755 can communicate with a chipset 760 that can control input to and output from processor 755. In this example, chipset 760 outputs information to output 765, such as a display, and can read and write information to storage device 770, which can include magnetic media, and solid state media, for example. Chipset 760 can also read data from and write data to RAM 775. A bridge 780 for interfacing with a variety of user interface components 785 can be provided for interfacing with chipset 760. Such user interface components 785 can include a keyboard, a microphone, touch detection and processing circuitry, a pointing device, such as a mouse, and so on. In general, inputs to system 750 can come from any of a variety of sources, machine generated and/or human generated.

Chipset 760 can also interface with one or more communication interfaces 790 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 755 analyzing data stored in storage 770 or 775. Further, the machine can receive inputs from a user via user interface components 785 and execute appropriate functions, such as browsing functions by interpreting these inputs using processor 755.

It can be appreciated that exemplary systems 700 and 750 can have more than one processor 710 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method comprising:

receiving, by a processor of a content management system, a plurality of credentials from a user having an account with the content management system, wherein each credential is associated with at least one content item repository and each credential comprises at least one of a username, a password, a personal identification number (PIN), a one-time password, third-party service login information, or a self-identifying secret question and answer;

accessing, by a processor of the content management system, the content item repository using at least one of the plurality of credentials if authorization is required for data access;

identifying, by a processor of the content management system, source content item data in the content item repository;

duplicating, by a processor of the content management system, the identified source content item data from the content item repository into the account at the content management system to create consolidated content item data in the content management system account, wherein duplicating the source content item data further comprises creating, by a processor of the content management system, a respective subfolder in the account for each of the plurality of content item repositories and storing, by a processor of the content management system, duplicated source content item data in respective subfolders;

accessing at a regular interval, by a processor of a content management system, the content item repository using at least one the plurality of credentials if authorization is required for data access;

identifying, by a processor of the content management system, any change in the source content item data in the content item repository;

updating, by a processor of the content management system, the consolidated content item data in the content management system account to match the changes;

identifying, by a processor of the content management system, duplicate content item data in the consolidated content item data;

deleting, by a processor of the content management system, the duplicate content item data; and providing, by a processor of the content management system, access to the duplicated source content item data, the access provided to a web interface.

2. The method of claim 1, wherein a user has a plurality of credentials for a plurality of content item repositories, and wherein the plurality of content item repositories comprises at least one of a local storage, an e-mail server, an online photo-sharing service, an online file storage service, a social media service, a Rich Site Summary (RSS) feed, or a mobile app.

3. The method of claim 2, further comprising retrieving, by a processor, a ranking of the plurality of content item repositories, and processing identified source content item data in accordance with the ranking.

4. The method of claim 1, wherein the source content item data is identified and duplicated via an application programming interface (API) connection to the at least one content item repository.

5. The method of claim 1, further comprising:

retrieving, by a processor of the content management system, metadata associated with the source content item data; and storing, in the account at the content management system by a processor of the content management system, the metadata to complement the consolidated content item data.

6. The method of claim 5, further comprising organizing, by a processor of the content management system, the consolidated content item data based on at least one of the metadata or user input.

7. The method of claim 6, wherein organizing the consolidated content item data comprises at least one of generating, by a processor of the content management system, a logical content item album or storing, by a processor of the content management system, the consolidated content item data in a hierarchical file structure.

8. The method of claim 5, wherein the metadata comprises at least one of a timestamp, a camera type, a lens type, an exposure, an aperture, a geo-location tag, a personal identification tag, an event tag, a rating, a user comment, or facial recognition data.

9. The method of claim 1, wherein the duplicate content item data is identified by one of user input or heuristics.

10. The method of claim 1, further comprising:

storing, by a processor of the content management system, the plurality of credentials in the account at the content management system, to yield a plurality of stored credentials.

11. The method of claim 10, further comprising:

accessing, at a regular interval, by a processor of the content management system, the plurality of content item repositories, using the plurality of stored credentials if authorization is required for data access;

identifying, by a processor of the content management system, any changes in the source content item data in the plurality of content item repositories; and updating, by a processor of the content management system, the consolidated content item data to match the changes.

12. The method of claim 1, further comprising:

accessing, by a processor of the content management system, a social network associated with a content item repository within the plurality of content item repositories;

identifying within the social network an associate of the user's by a processor of the content management system, wherein the content item repository contains social content item data associated with the associate, and wherein the user is authorized to access the social content item data; and duplicating, by a processor of the content management system, the social content item data in the account at the content management system.

13. A system comprising:

a processor; and a non-transitory computer-readable storage medium storing processor-executable instructions for causing the processor of a content management system to:

receive a plurality of credentials from a user having an account with the content management system, wherein the plurality of credentials are associated with a plurality of content item repositories and each credential comprises at least one of a username, a password, a personal identification number (PIN), a one-time password, third-party service login information, or a self-identifying secret question and answer;

access the plurality of content item repositories using the plurality of credentials;

identify content item data in the plurality of content item repositories to yield source content item data;

duplicate the source content item data in the account at the content management system to create consolidated content item data in the content management system account, wherein duplicating the source content item data further comprises creating a respective subfolder in the account for each of the plurality of content item repositories and storing the duplicated source content item data in respective subfolders;

access, at a regular interval, the content item repository using the credential if authorization is required for data access;

identify any change in the source content item data in the content item repository;

update the consolidated content item data in the content management system account to match the changes;

identify duplicate content item data in the consolidated content item data;

delete the duplicate content item data; and provide access to the duplicated source content item data, the access provided to a web interface.

14. The system of claim 13, wherein the plurality of content repositories comprises at least one of a local storage, an e-mail server, an online photo-sharing service, an online file storage service, a social media service, a Rich Site Summary (RSS) feed, or a mobile app.

15. The system of claim 13, wherein the source content item data is identified and duplicated via an application programming interface (API) connection to at least one of the plurality of content item repositories.

16. The system of claim 15, further storing processor-executable instructions for causing the processor to retrieve a ranking of the plurality of content item repositories, and to process identified source content item data in accordance with the ranking.

17. The system of claim 13, wherein the non-transitory computer-readable storage medium further stores processor-executable instructions for causing the processor to:
- retrieve metadata, associated with the source content item data, from the plurality of content item repositories;
- store, in the account at the content management system, the metadata to complement the consolidated content item data; and
- organize the consolidated content data based on at least one of the metadata or user input.

18. The system of claim 13, wherein the
identifying duplicate content item data in the consolidated content item data by using one of user input or heuristics.

19. A non-transitory computer-readable storage medium storing processor-executable instructions for causing a processor of the content management system to:
- receive authorization from a content item repository to access data in the content item repository by using at least one of a plurality of credentials provided by a user having an account with the content management system, wherein the data is associated with a user having an account with the content management system and each credential comprises at least one of a username, a password, a personal identification number (PIN), a one-time password, third-party service login information, or a self-identifying secret question and answer;
- identify source content item data in the content item repository;
- duplicate the identified source content item data from the content item repository into the account at the content management system to create consolidated content item data in the content management system account, wherein duplicating the identified source content item data further comprises creating a respective subfolder in the account for each of the plurality of content item repositories;
- store duplicate copies of the source content item data in respective subfolders in the account at the content management system to yield consolidated content item data;
- access, at a regular interval, the content item repository using at least one of the plurality of credentials if authorization is required for data access;
- identify any change in the source content item data in the content item repository;
- update the consolidated content item data in the content management system account to match the changes;
- identify duplicate content item data in the consolidated content item data;
- delete the duplicate content item data; and
- provide access to the duplicated source content item data, the access provided to a web interface.

20. The non-transitory computer-readable storage medium of claim 19, further storing processor-executable instructions for causing the processor to:
- access a social network associated with the content item repository;
- identify within the social network an associate of the user's, wherein the content item repository contains social content item data associated with the associate; and
- duplicate the social content item data in the account at the content management system.

21. The non-transitory computer-readable storage medium of claim 19, further storing processor-executable instructions for causing the processor to:
- retrieve metadata associated with the source content item data from the content item repository; and
- store, in the account at the content management system, the metadata to complement the consolidated content item data.

22. The non-transitory computer-readable storage medium of claim 19, further storing processor-executable instructions for causing the processor to retrieve a ranking of the plurality of content item repositories, and to process identified source content item data in accordance with the ranking.

* * * * *